X 3089 Mar. 24. 1819. 45

Benjamin Dearborn
Letters Patent

The Schedule referred to in these Letters Patent and
making part of the same containing a description in the words
of the said Benjamin Dearborn himself of his improvement on
his Balance.

---

Abstract of the original specification of the Vibrating Steelyard or
just Balance patented February 14th 1799.
The Vibrating Steelyard
or just Balance is made partly of iron and partly of steel, of any dimensions re-
quisite for weighing the smallest or largest articles from gold coins to hogsheads
of Sugar &c.
The Beam is graduated on one edge with notches, on which two poi-
ses are hung, (or one only) as occasion may require. The poises (or peeses they are
usually termed) may be made of lead, iron, brass, or any other metal, or even of
stone. If made of lead they should be guarded by a brass or other durable case,
to prevent a reduction of weight by wearing; and by those who use the instrument
all its parts should be preserved from corrosion. This steel yard, when con-
structed of the most convenient size for family use, will weigh from one pound
to two hundred and fifty; and one of the poises must weigh two pounds, and the
other sixteen pounds, every notch on the Beam producing a variation of two
ounces with the small poise and one pound with the large in Avoirdupoise
weight. The poises might be made of other sizes but these are the most conven-
ient. The long arm of the beam is made sloping upward to nearly a sharp
edge, on which the notches are cut. On the two sloping sides are figures de-
noting the weight, one being marked for the small poise, and the other for the
large, which must be added together when both poises are on. A steelyard
of this construction, to weigh five hundred weight needs only to have its parts made
stronger, and the large poise to weigh thirty two instead of sixteen pounds, doubling
all the numbers on the large side of the Beam. The notches with the thirty two
pound poise will produce a variation of two pounds each, and to obtain single pounds
on

X 3089 2 or ounces the small poise must be added, and the sum of their weight taken as before. Other variations might be produced by the addition of more hooks, but the above is the simplest construction.

In this steelyard a sufficient weight of iron is extended on one side of the centre of motion to counterbalance the arm on which the poises are to hang; the centre of motion is placed above the centre of gravity, and in a line with the points of suspension; by these means the Beam vibrates like a scale beam during the process of weighing an article and when the weight is off— the friction being as much as possible reduced by terminating the friction parts of the gudgeons with sharp edges, and resting them in circles sufficiently large to prevent their blocking on either side, in turning.

A proof of the accuracy of this Balance is obtained by an experiment, which can be made on no other Beam hitherto invented. It is as follows: In weighing any article sufficiently heavy to balance both poises (say 100 lb) the poises may be put on any two numbers which added together will produce 100; for example, one poise may be put at 90, and the other at 10; or one at 95, and the other at 5; one at 80, and the other at 20; one at 78, and the other at 22; and so on throughout the extent of the Beam; and if the workmanship be accurate the numbers will perfectly correspond."

The foregoing abstract describes the instrument as originally made, and the drawings filed in the Patent Office shew the form of the Beam as then patented; consequently no patent is now solicited for any application of principles contained therein; but for valuable improvements since devised, which are particularly described in the following Sections to wit: Section first. A device for raising the centre of gravity so high that it shall be very little lower than the centre of motion. This is found to produce an easy and ready movement in a beam which would turn heavily if the butt were made straight, as described by the drawings originally lodged in the Patent office, by which construction the centre of gravity was placed far below the centre of motion in all those which were made before this discovery. This essential improvement is effected by bending the butt of the beam upward in any form the operator chooses, but a curve, forming nearly a segment of a circle, is found to be most easily produced ment. The mode of ascertaining the correct curvature for producing the
proper effect, is by trying the movements of the Beam when suspended; for
if it be too much curved or raised, it will thereby become what is usually termed
a dead beam; that is, one arm or the other will fall and remain down, with
out vibrating. If the curvature be not enough, the Beam will turn heavi
ly; and in either case it should be altered until it is correct. A similar
effect may be produced by placing a weight on the top of the Beam, or on the
ridge, but it would be less convenient than turning up the bull, as here
described. Section second. A device for extending the range of a Beam
so as to render it susceptible of weighing much lighter articles than it would
otherwise be suitable for. This purpose is effected by fixing in the bull a
third pivot, on a line with the graduated edge, and at such a distance
from the centre of motion that any article suspended thereon shall lift the
weight on the Beam with ten times the power that the same weight on the
same division would be lifted by suspending that article on the pivot nearest
to the centre of motion. This third pivot must have its appendant parallel
and swivel, and one pound suspended thereon will balance the weight on
the Beam at the division of ten, two pounds will balance it at the division
of twenty, and so on through the whole extent of the Beam. If it be required
that a Beam shall descend to still smaller quantities, the third pivot may
be placed where any article thereon will lift sixteen times as much as if the
same article were suspended on the pivot nearest to the centre of motion.
The weight of any article suspended from a pivot so placed will be given
in ounces by the figures on the Beam, and this by using the same weight
which is used for weighing pounds on the other pivots. The new application
of a principle described in the first Section, namely, the raising of the centre of
gravity in Beams, is essential in the construction of Beams generally; that in
the Second Section, namely, the increasing of the range of Beams, so as to fit
them for weighing very small quantities is not considered as essential in all
Beams, but as an accommodation for those who may want Beams so con
structed. Section third. A device for weighing gross hundreds by the
Beam, without arithmetical calculation.

This purpose is effected by using small

4
X3089.4 small weights called Gross, which are hooked on the weights belonging to the Beam during the operations of weighing. They are so adjusted as to make an addition of twelve per cent, to every weight for which they are designed, and bear a stamp accordingly, as gross 8, gross 16, gross 32, gross 64, and when used with the weights to which they respectively belong, every 100 on the is a gross hundred, or 112 pounds, and so of the component parts of a gross hundred. In the form and construction of the grosses, they are similar to the weights for the Beam, except that the hook is not made sharp.

Section Fourth. A device for balancing the scale or such other appendage as may be suspended to the Beam for holding the article to be weighed. This purpose is effected by making a hole through the Beam near the extremity of the graduated arm, and suspending therein a balance weight so adjusted as to be an exact equipoise for the scale or other appendage which holds the article to be weighed. Instead of a hole through the Beam for suspending the balance weight, as before described, a small pivot and parallel may be fixed at the same place, for suspending the balance weight thereon, but it is not so simple as the mode before described.

Section Fifth. A device for suspending a balance from the timbers of a building, and lifting the balance with the article which is to be weighed, and sustaining them during the operation. This is effected by an instrument called a Lever and Loops, which consists of a bar of iron suspended by a loop of iron, with a bolt or rivet passing through both, on which the Lever turns as on a fulcrum. The size and strength of this instrument are proportioned for the weight it is designed to lift: consequently the dimensions vary, although the different sizes are similar in their form and construction, which are as follows: From a bar of iron of suitable size for the required strength, a piece is cut off sufficiently long for the Lever: it is then drawn tapering, so that one end is made less than the other by a gradual diminution through about two thirds of its length, the other third retaining its original size. At the small end a hole is made to receive the hook of a chain. At the large end a piece is welded on the flat side to make that end double, but the union of these pieces is not continued nearer to the end than a distance of three or four inches therefrom. As near the the large end as will leave sufficient strength, a hole is made through both parts for receiving a rivet. A similar hole is made through the single bar at such distance from the former as may be equivalent to a fifth, sixth, or seventh part of the whole length of the Lever, according to the design of making the power greater or less, this hole being for the bolt whereby the Lever is suspended. At the large end of the two parts are set open a proper distance for receiving between them a flat bar of iron, called the tongue of the Lever, which may be of any length required, from four inches to as many feet. The tongue has a hole in one end for a rivet, and that end is rivetted in the open space at the end of the lever; but in such a manner that the tongue shall move freely. At the other end of the tongue a larger hole is made for receiving the hook or swivel of a balance to be suspended therein. The loop is a bar of iron of any required length, made round in the centre and flat at the ends. At each end a hole is made for a bolt or rivet; and the bar is bended in the middle, so as to bring the two holes in the ends opposite to each other, leaving a space for the thickness of the Lever to be inserted between the two ends of the Loop. The lever is bended edgewise between its centre and the hole for the loop, so that when it is suspended and the small end is level, the large end will fall five or six inches below the same level line continued. The Loop is fastened to the Lever by a bolt or rivet passing through both, but in such a manner that the Lever shall move freely without binding in the Loop. At the small end of the Lever a chain is fastened by a hook for drawing down that end and thereby lifting the Balance with its load. To the chain one or more handles are attached which from their peculiar form, are called triangular handles, and are constructed as follows, to wit, a piece of iron wire sufficiently large to be welded is cut to any suitable length from one to two feet; and at each of its ends an eye is turned and welded, making thereby a ring of about three quarters of an inch diameter for a handle of wood. The wire is bended in the centre into an angle, until the two eyes are within four or five inches apart, just above each eye another bend is given to the wire so that the two eyes shall hang perpendicularly when the apex of the angle is uppermost. A wooden handle about five or six inches in length, is turned in a lathe, with a shoulder near each end, the part

X3089 6 part outside the shoulder being a short cylinder of a diameter suited for the eyes of the wire angle, which are put on the handle, and being brought to bear hard against the shoulders of the handle, are confined by a pin through each end of the handle outside the eyes of the wire. The middle of the handle is made of a size convenient for the hand to grasp, and the strength of the whole is competent for bearing all that a man can draw down thereon. To fix this handle on a chain, the screw is taken out, and the wire angle is passed through any link of the chain where it may be most convenient for use, the screw is then put in and pinned as before described. When the Lever and Loop are to be used, the Loop is put on some hook or other appendage previously fastened to a timber over head; the Balance is suspended from the hole in the lower end of the tongue, and it is lifted, with the article to be weighed, by drawing down on the chain, which is made fast, during the operation of weighing, by hooking a link of the chain over a lever catch placed in some convenient situation for that purpose. The lever catch is an iron formed much like the common catch driven into a door frame to receive a latch: the only difference consisting in the lever catch being made stronger, and having the outward end turned downward a little to prevent the chain from slipping off.

Section Sixth. A device for lifting the Balance, with the article which is to be weighed thereby, and sustaining them during the operations of out door weighing. This is effected by a single lever for smaller Balances and a double lever for larger Balances. The single Lever is similar to the lever described in the fifth section in all respects except that it is bended in a contrary direction, and has a fulcrum instead of a loop. The fulcrum is made of two pieces of bar iron, from eight to twelve inches long and of such size as shall ensure the required strength, the flat surfaces of the two pieces are laid together and welded at one end; at the other end a hole is made through both, for a bolt on which the Lever is to operate between the two bars. At the welded end a bolt is drawn out from the centre, having a shoulder above it on two sides. This bolt is square next to the shoulders, to prevent it from turning round, when driven into wood, and is round at its extremity to receive a nut with a screw. A flat piece of iron has a square hole made through

X3089 7 through it, to fit the square part of the bolt, and is put thereon to prevent the
shoulders of the fulcrum from sinking into the wood. The fulcrum is secur-
ed to the head-piece of the frame described in section seventh, by driving the
bolt through a hole in the head-piece and screwing on a nut. This lever
is accompanied with a chain, handles, and lever catch, as described in sec-
tion fifth, and its tongue passes through a mortise in the head piece of the frame
the lever catch being driven into a rail placed in the frame for that purpose,
and to unite the parts of the frame, and keep them from spreading. The dou-
ble lever consists of two single levers with their fulcrums, chains-handles, and
lever-catches, similar to the preceding description, except that one of them has
two tongues, and the other one, the three tongues passing through a mortise in
the head piece, are united by a bolt under the head piece, to which bolt a loop
is attached for sustaining the Beam when suspended and for lifting it with
the article to be weighed, by drawing on both levers which are placed in oppo-
site directions.

Section seventh. A device for supporting the Balance and its
apparatus in operations of out door weighing, and so constructed as to be eas-
ily moved about, without being separated or taken down. This is effected
by an instrument called a Frame, consisting of two pairs of legs and a head
piece constructed in the following manner: From a plank of hard wood
such as Oak, ash &c of suitable thickness, two strips are sawed of such
length and breadth as the intended frame may require. These two pie-
ces are united together in an angular position, that is, they are brought
close together at one end, and separated at the other end a sufficient
distance to make the frame stand firmly when set up. They are secur-
ed to each other by one or more rails or cross bars with tenons and pins in
the open part, and a piece in the form of a wedge bolted between them near
the narrow end. The wedge is not brought to a sharp point, but is left
about an inch thick at its smallest end, to take part of the bearing
of the head piece, the other part of the bearing being placed on two shoul-
ders made just even with the end of the wedge in the two pieces which
are partly cut away above the wedge so as to produce a parallel opening sim-
ilar to three sides of a mortise, for receiving the neck of the head piece therein
another

8 X3089 8 another pair of legs, being made in the same manner, one pair supports one
end of the head-piece and the other pair supports the other end constituting
four bearings or feet, on which the whole mechanism is supported when in
use and the ends of the rails run through the legs a sufficient distance to
constitute handles for lifting the Frame and Balance. The Head piece
is a piece of timber (generally Oak) of suitable dimensions for the frame in
tended to be made. Its thickness is usually about double the space in the
parallel opening above mentioned and its breadth about a quarter more
than its thickness. On the two broad sides a piece is taken out near each
end making thereby four spaces each of which is of a depth equivalent
to about a quarter of the thickness of the Head piece and of a length sufficient
to receive the tops of the legs with a wedge to secure it. A neck is thus form
ed near each end of the head piece to fall into the parallel opening of the
legs and be fastened by wedges. From this description it will be seen that
the neck is about half the thickness of the timber and each neck must be
a sufficient distance from the ends of the head piece to leave substance out
side the neck for driving the wedges without danger of splitting off the
parts against which they bear. The outer shoulders of each neck are usu
ally made a little tapering or dovetailing inward to prevent the wedges from
working out, and the legs are so set as to spread a little wider below than at
top. Four wedges are made to fit the spaces here described and thereby bind
the parts firmly together, and to prevent the wedges from being lost they
are fastened by short chains at the different quarters where they belong. In
the centre of the head piece a mortise is made through it for the tongue of
the single lever or the three tongues of the double Lever, and these tongues
are always so long as to reach a little below the lower surface of the head
piece when the small end of the Lever is down. The bolt of each fulcrum
is driven through a hole in the head piece, and is secured by a nut below
and the lever catch is fixed in the rail or cross bar before mentioned.
Section eighth. A device to confine the graduated arm of the Balance
in its proper station when mounted and thereby guard it from the inju
rious result of a sudden impulse. This is effected by an appendage
called a guard constructed in the following manner: A roller from two to
four two inches long and from one to three inches diameter is made of cast iron,
brass, or copper tempered with a little pewter, which is considered best and
is cast with a hole in its centre to turn on a pin. It may be cylindrical in
the whole length or partly so in the centre with a projecting flanch at
each end. and the hole through it must be sufficiently large to receive an
iron pin of competent strength for the greatest pressure with which the Balance
can operate thereon when loaded with its utmost quantity. The pin is
made from a round rod, as large as the hole in the roller will admit to turn
freely thereon, it is cut from six to twelve inches long according to the pur-
pose required, and at one end is drawn square and sharp pointed to drive
into wood, the remainder of its length being round. Near the centre of its
length it is turned at a right angle or very nearly so. the sharpened end
is then passed through the roller and at a suitable height for the arm of
the Balance is driven into one of the legs of the frame as far as the length
of the roller will permit without confinement. The other end of the pin
is turned downward and projects some inches below the roller making there-
by a space between the pin and the frame, for the graduated arm of the
Balance to be confined in under the roller. To guard the Balance from
being accidently thrown out of this space; a spring is placed below it con-
structed as follows. From a round iron rod similar to the pin before describ-
ed, a piece is cut from one to two feet long according to the length of the spring
required. One half of its length, or a little more, is drawn flat to a thin sub-
stance and has two or more holes made therein for nails or screws. it is af-
terwards hammered cold to give it the necessary elasticity for a spring,
near the other end it is bended into a right angle. making thereby a short
lip about half an inch long. It is then bended into such a form that the
spring when finished very much resembles the figure 7. the longest line
of the figure representing the elastic part of the spring, at the lower extremity
of which it is fastened by screws or nails to the leg of the frame. Previous to the
spring being put on, a mortise is made in the leg of the frame, a small distance
below the end of the roller-pin which extends downward below the roller,
This mortise is cut nearly through the leg, and is just large enough for
the upper part, or horizontal line of the spring with its lip to move freely
therein thereon. The spring is then fastened on, with its upper end first entered in the mortise, and at a small distance below the lower end of the roller pin but not so far down as to permit the arm of the Balance to come out between them without pressing the spring inward. A wire pin is then driven through the leg across the mortise and near its outer surface, that the top of the spring may strike against it inside and be thereby prevented from being thrown out of the mortise. By this construction the bottom of the mortise prevents the spring from being pressed too far inward and the wire pin prevents it from being drawn too far outward. The space between the roller and the spring, is sufficient to give the arm of the Beam a small perpendicular motion between them, and the arm is put in or taken out of that space by pressing on the spring and passing the arm of the Balance between that and the lower extremity of the roller pin. A guard of this description is usually placed on each pair of legs so that the arm of the Balance may be turned to the right or — left side as the operator chooses and be guarded in each position. The spring here described might be made of steel but it would be more expensive, and more liable to be broken, without being more useful. When a Balance is suspended from the timbers of a building, the guard is fastened either to the wall of the building or to some piece of wood fixed in a convenient station for the purpose. During all operations of weighing, the arm of the Balance should be constantly kept within the guard except at the period of ascertaining the weight of the article, when it is usually taken out, and returned as soon as the weight of the article is noted. Some experiments have been made by cutting the roller round an iron pin fast in the roller, and projecting at each end as an axis turning with the roller, but the fixtures in this mode are found to be more expensive without producing any essential benefit and consequently a particular description thereof is here omitted.

Section ninth. A device to take hold of hogsheads and casks of other dimensions, and sustain them in the operation of weighing, without rolling them from their stations. This is effected by an appendage called Sliding Canhooks, constructed in the following manner. From a broad bar of iron a piece is cut off ten or twelve inches long: the length breadth and thickness being sufficient for the strength required in one of the hooks. At one end this piece is drawn to a breadth of five to seven inches, and turned in the form of a hook to take hold of the chimb of a cask. Near the other end a piece is cut out, making a square hole to receive the flat bar which is to slide therein. The iron at the outer or upper extremity of this square hole is made round like a bolt, on which the catch is to turn. The iron on the two sides of the hole is then bent up upwards in a contrary direction to the bend of the hook; and is thereby sufficiently raised for the flat bar of the Can hooks to slide in the hole on the back of the hook, and under the catch, which is thus formed: A piece of iron, flat or square, from six to ten inches long is made thin at one end, and as broad as the square hole will admit to move freely; it is then turned over in the manner of making a hinge, and being inserted in the square hole is fixed round the upper extremity of the hook and welded round it in such manner that it shall turn freely thereon as on a bolt. The other end of the catch is made round like a bolt, and at the extremity about half an inch is turned downward at a right angle, making thereby a hook to catch in the holes of the flat bar hereinafter described, and keep the can hook stationary, where fixed. From a flat bar of iron sufficiently strong for the purpose intended, a piece is cut from two to three feet long) and close to one end a round hole is made to receive a ring; at the other end a circular loop is made of sufficient diameter to prevent the can hook from slipping off, and to receive a lever passing through it, for straining the flat bar downward if occasion requires. Between the loop and the hole for the ring a number of holes are made for receiving the short hook of the catch, and thereby expanding or contracting the grasp of the can hooks for casks of different lengths. Another hook, catch, and flat bar are made in the same manner, and the two are united by a ring at top, to which one or more links of chain may be attached if wanted. The parts here described constitute a pair of can hooks, the dimensions of which vary according to the powers of the different Balances for which they are calculated. Section tenth. A device for holding extensive quantities of bulky Merchandizes such as

X 3089 12 as Hemp, bags of Coffee or Spices &c and sustaining them in the operation
of weighing.

The instrument for this purpose is called a Folding Scale and is
constructed in the following manner. Two similar pieces of oak or other strong
wood are prepared for the two sills of the Scale, the dimensions of each being as
follows viz. length about seven feet six inches, breadth four inches, thickness three
inches. They are placed parallel to each other (with the narrow surface upward) at
a distance of about twenty inches in the clear between them, and are fastened
to each other by six flat bars of iron two of which bars are rivetted on the upper
surface of the sills at a distance of ten inches from their ends; two others are rivetted
on the under surface of the sills at a distance of ten inches from their ends. These
four iron bars are just as long as the breadth of the scale from out to out, that
is, about twenty six inches each in length. The two remaining bars are made so
long, as to be turned up at a right angle at each end of each bar as high as the
breadth of the sills, and to leave a space between the ends of the bars so turned
up, and the outside of the sills, of about three quarters of an inch on each
side; consequently the clear space in each bar between the parts so turned up
at the ends, is about an inch and a half more than the breadth of the scale
from out to out. These two bars are rivetted to the under surface of the sills
six inches apart, each being three inches from the centre of the length of the
sills. In each of the four ends turned up a hole is made to receive a rivet or
bolt, passing horizontally through the iron into the sills, by which the scale
with its load is to be suspended. These six iron bars may be about an inch
and a half broad, and they must all be perforated with as many holes as are
required for the before mentioned rivets or bolts; the four bars which are un
der the sills, must also have as many other holes as shall be requisite for
rivetting upon them a flooring of boards. An iron loop is attached to each
end of the scale, in such a manner as that they may turn inward, and lie
flat on the bottom of the scales, or turn outward to an angle of about forty
five degrees and be firmly supported in that position. These loops are sim
ilar to each other in form and size, being made in the following man
ner: A bar of iron about eight feet long has a hole made about four inches
distance from each end for a rivet of proper strength. It is then bended in the
centre centre of its length into a semicircle, the diameter of which is nearly equal to the
distance between the sills inside; the other parts of the bar remain straight, and con-
stitute two parallel legs. one of which is rivetted inside each of the sills midway
between the two bars rivetted near the end thereof. On these two rivets the loop
turns, and when thrown outward, the extreme ends of the two legs bear against
the lower bar, and at the same time the legs come to a bearing also against the
upper bar, whereby the loop is sustained in the angular position before described, for
supporting a weight to be loaded thereon when in use. When out of use each
loop is turned down on the floor of the scale between the sills. This scale is sus-
pended to the Balance by a forked iron, made in the following manner: a
bar of suitable strength from an inch and half to two inches wide, is cut to a
length of three or four feet; one end is split in the centre of the width for about
a foot in length; the two parts are opened into a fork, each part having a
hole near the end to receive a bolt or rivet. This fork is opened so as to bring
the distance of the two holes equal to the distance of the holes in the ends of the
two bars rivetted under the scale nearest its centre. One of these forked pieces
is made for each side, and above the forks both are bended so that they may
meet at top where they are welded together. At this union another piece
is welded on having at the other end an eye, with two or three links of chain
therein, for being suspended thereby to the Balance at any convenient height
above the ground. The two forks are put into the spaces between the outside
of the sills and the iron bars turning up, as before mentioned. A rivet on each
side fastens the forked iron to the sills and on this rivet that iron turns so
as to be laid flat on the scale and be packed in small compass. When the
scale is to be used, that iron is turned up into a perpendicular situation
and two bolts are put into the other two holes of the forks, whereby the sus-
pending iron is made firm in its position. The two bolts are fastened to
their respective stations by short chains, to prevent their being lost.
A flooring of boards being rivetted on the four iron bars which are fastened
under the sills, makes a close bottom to the scale, and the two loops when
turned out, increase its length, so as to embrace an extent of eleven or twelve
feet. Some of these folding scales have been formed with wooden tongues
at the end instead of iron loops, but they were not so convenient, and are
therefore

770.

therefore not here described. Section eleventh. A device for holding bales of Cotton and sustaining them while weighing. This instrument is called Cotton-hooks, and is made in the following manner: A bar of iron about an inch square, is cut to a length from seven to nine feet, according to the length of the hooks intended. Each end is flattened out to a breadth of about two inches at the extremity, forming thereby, two tapering palms, and the centre of the bar is made round like a bolt, six or eight inches in length. in this round part the bar is bended, so as to bring the two palms together edge to edge, leaving a loop at the bend to receive a ring. The two parts are then bended together into a suitable curve for receiving a bale of cotton, after which they are spread apart to a distance of about two feet and a half at the palms, but still remain close together, at the part next below the loop. Two bars thus formed into hooks, are secured together by a ring welded in the loop of both so that the curves of the two shall be in opposite directions, to embrace a bale round and under such part thereof, as shall be competent for holding it to be weighed. When greater length is required it is produced by welding one or more links of chain in the ring.

Section twelfth. A device for holding boxes of Sugar on end, or other articles, and sustaining while weighing. This instrument is called a Standing Scale, and is made in the following manner: a bar of iron of about five feet long, two inches wide, and of proportionate thickness, is bended edge wise, at about two feet from one end, so as to form a right angle. This bend is not turned to a sharp corner, but in a short curve, which is least liable to crack in working, and strongest when finished. Another bar of similar dimensions is turned in the same manner. In the shorter leg of each, two holes are made for rivets, one near the bend, and the other near the extremity; these holes are alike in each, so that when the two angles are placed side by side, the holes are opposite each other. Just above the turn of the angle each of the longer legs is bended flat wise in opposite directions, so that when the two shorter legs are placed on a plane, with their sides perpendicular, and parallel to each other at a distance of about two feet apart, the tops or extremities of the two longer legs shall meet and be welded together. At this union another bar is welded to the two united angles, which is of the following form: From a

X3089 15 a bar somewhat larger than that above described, a piece is cut about three
feet long, and an eye or loop of two or three inches diameter, is formed at one end,
for suspending the scale thereby to the Balance. At about a feet distance
from the loop, the bar is bended crosswise, in the manner above described, so
as to form a right angle, and the end of the longer leg is welded to the other
angle at their union. To constitute a base for the flooring of the scale, two
other bars are formed and fastened in the following manner: From a bar
which may be somewhat less than either of the foregoing, a piece is cut about
three inches longer than the clear space between the two short legs of the first
mentioned angles. Close to each end of this bar a hole is made of the same
size as the holes in those short legs, these holes are made for rivetting the bar
to those legs, and four other holes are made between them at proper distances
for rivetting the wooden flooring to the iron. Each end of the bar is then turn
ed up about an inch and a half, and the bar being placed between the short
legs, is rivetted to them at the holes nearest to the bend in the legs. Another bar
is formed in the same manner to be rivetted to the short legs at their out
ward extremity. At the centre of this bar a small piece of iron is rivetted
for attaching a chain to the front of the Scale for sustaining a heavy load.
This piece is from three to four inches long, having near one end a hole for
a rivet, and at the other an eye or loop for receiving the hook of a chain;
between these it is turned at a right angle, and when rivetted on the bar
the eye is upward, the top of it being about even with the surface of the
wooden bottom, to be now described. Upon the two bars last described a woo
en bottom is fastened by rivets; the bottom may be of hard wood or pine;
and from an inch and half to two inches thick. The scale thus formed has
competent strength for sustaining the common boxes of Havanna Sugar
or any other articles not exceeding four or five hundred pounds, but when it
is used for heavier drafts, the chain becomes necessary for supporting the front
of the scale. For this purpose a chain with a hook at each end, is provided:
one of the hooks being put in the eye at the front of the scale, the other is
passed through the loop above, through which the chain is drawn tight,
and the hook at its end is carried downward, at catched into any link
where it will keep the chain in that position. The foregoing completes
the the description of the Standing Scale as it is commonly used but another appendage is sometimes added to it which is a folding seat for persons to sit on who wish to be weighed. As this is a convenient though not a necessary addition, it is here separately described as part of the specification.

At a suitable height from the bottom of the Scale to make a seat, two small pieces of iron are rivetted to the longer legs of the two first right angles before described. Each of these pieces projects a small distance toward the front of the scale and has a hole in the projecting part, for the axis of the seat to turn in. The seat is formed of a piece of board of suitable length and breadth which is guarded from splitting by being fastened at each end to a small bar of iron running across it: One end of each of these bars is turned outward and rounded, so as to form a pin or axis at each end of the seat. An iron stand and constituting two legs, supports the front of the seat, which standard also turns as on an axis, and when the seat is turned up it is fastened in that position by a small hook; and the iron standard lies flat against the lower surface of the seat, the whole being constructed in the manner of a common hanging table against the wall of a room, and thus is placed out of the way, when articles of merchandize are to be weighed. As some of the articles describ[ed] in the foregoing sections are made of dimensions, varying according to the strength and scope required, it is deemed sufficient to add here the dimensions of the parts of a Lever Balance, and apparatus of a medium size, say one for weighing one thousand pounds. which are as follow:

The Beam

| | Feet | Inches |
|---|---|---|
| Whole length of the Beam | 5. | 9. |
| Length of the Butt | 2. | 1. |
| Length of the graduated Arm | 3. | 8. |
| Thickness of Butt at its centre | | 1/2 |
| Elevation of top of Do. above the line of the graduation arm | | 5. |
| Width of graduated arm 2 1/2 inches tapering to 1 inch | | |
| Thickness of Ditto 1/2 " tapering to 1/4 " | | |
| Ditto of Beam at centre of motion | | 3/4 |
| Width of Do at do | | 4. |
| Distance between the two pivots | 2. | 1/4 |

| | Feet | Inches |
|---|---|---|
| Diameter of pivots (elliptical form) widest way | | 1/2 |
| Projection of Do each side | | 1. 1/2 |
| Length of upper and lower parallels each | | 5. |
| Thickness of swivels to upper & lower parallels | | 3/4 |
| Diameter of eyes to the parallels | | 1. |

The Canhooks

| | Feet | Inches |
|---|---|---|
| Length of flat bars to Canhooks each | 2. | 10. |
| Number of holes in each bar six | | |
| Size of holes | | 1/4 |
| Length of Catches each | | 8. |

Breadth

X 3089

17

273.

| | Feet. | Inches |
|---|---|---|
| Breadth of palms at outer end each | | 7. |
| Length of straight part of palm | | 5. |
| Breadth of Ditto at upper extremity | | 3. 1/2 |
| Thickness of Ditto at Ditto | | 1/2 |
| Size of square hole in Ditto | | 2. - |
| Thickness of ring connecting the two bars | | 3/4 |
| Diameter of the Ring | | 3. - |
| Thickness of the two links attached to Ring | | [illegible] |
| Tot weight of the Two hooks thirty one pounds | | |
| **The Frame** | | |
| Size of the legs ... 3 inches by 2 1/2 inches .. | | |
| Length of Ditto | 6. | 6. |
| Size of the Head-piece ... 3 feet by 4 1/2 feet .. | | |
| Length of Ditto | 6. | 6. |
| Thickness of necks in Ditto | | 1. 1/2 |
| Length of necks 3 1/2 inches tapering down to 3 inches | | |
| Substance at each end of Head piece outside the neck | | 4. 1/2 |
| Thickness of the mortise for the tongue of the Lever | | 1/2 |
| Length of Mortise | | 3 1/2 |
| Length of rail uniting the legs | 1. | 4. 1/2 |
| Projection of ends of D° for handles to the frame | | 3. |
| Distance of rail from the ground | 2. | - - |
| D° between the two pair of legs immediately under Headpiece | 5. | 6. - |
| D° D° in same direction on the ground line | 6. | 9. - |
| D° between the feet of each pair of legs | 2. | - - |
| Length of straight part of the guard spring | | 9 |
| Length of the bend of the guard spring without the lips (which is 1 an inch) | - | 2. - |
| D° of Roller for the guard | | 2. |
| Diameter of Roller | | 1. |
| Length of Roller pin (turned down over the end of the roller) | - | 3. |
| **The Lever** | | |
| Whole length of the Lever | 3. | 9. - |
| Whole length of the tongue of the Lever | 1. | 3. - |
| Distance from centre to centre in the bolts of the Lever | | 6. |
| Size of the bar at large end of the Lever 2 inches by 7/8ths | | |
| Ditto of Ditto at small end near the chain 1 inch by 3/4ths | | |
| Length of the Lever chain (being 21 links & 1 hook) | 4. | 4. 1/2 |
| Number of triangular handles to the chain | | two |

Length

Benjamin Dearborn

Witnesses
Wm Elliot
Wm Blagrove

8070 Words.

Exd [illegible]

Patented March 24. 1819.